J. T. LISTER.
STORAGE BATTERY SYSTEM.
APPLICATION FILED JULY 27, 1910.
1,175,535.
Patented Mar. 14, 1916.
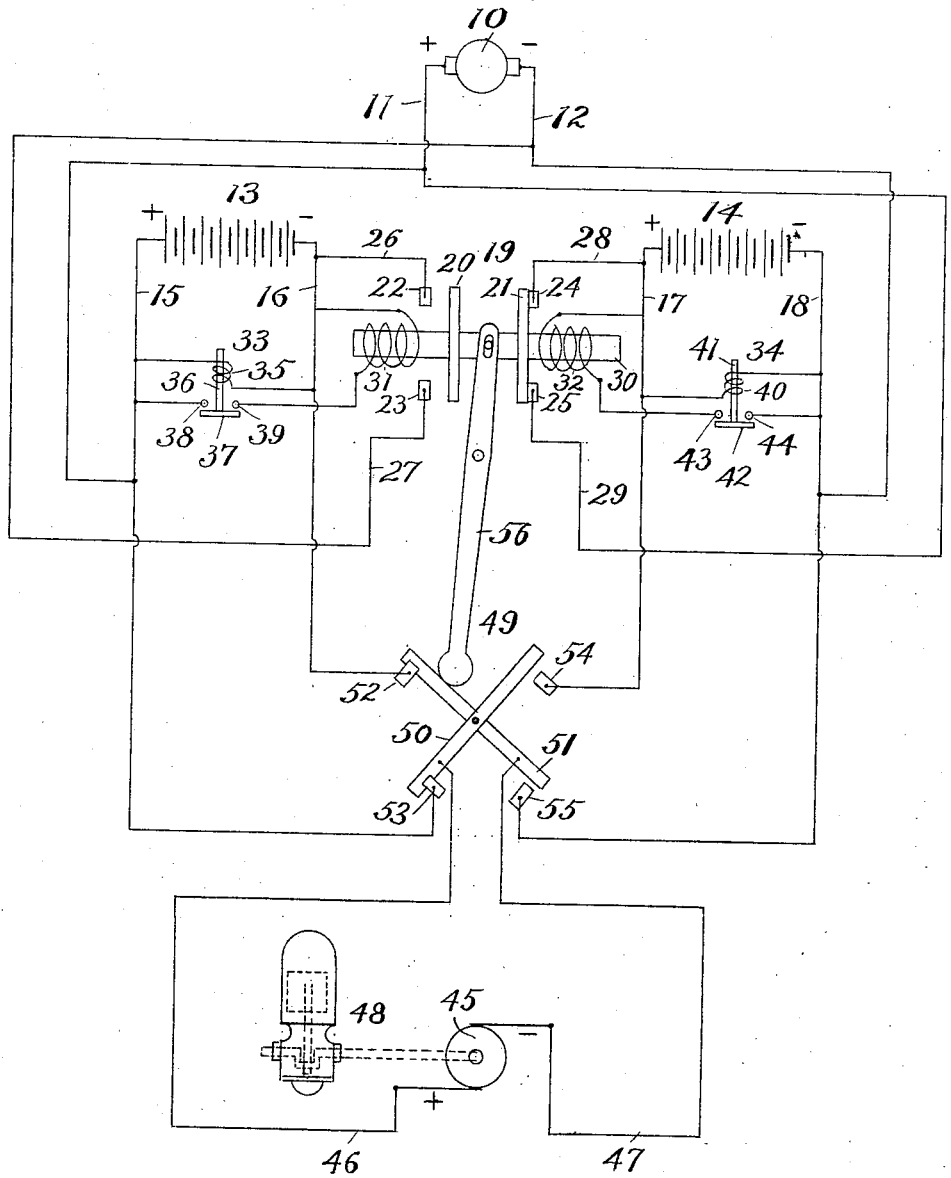

UNITED STATES PATENT OFFICE.

JOHN T. LISTER, OF CLEVELAND, OHIO, ASSIGNOR TO THE TURBINE MOTOR ELECTRIC CAR COMPANY, A CORPORATION OF OHIO.

STORAGE-BATTERY SYSTEM.

1,175,535.     Specification of Letters Patent.     Patented Mar. 14, 1916.

Application filed July 27, 1910. Serial No. 574,057.

*To all whom it may concern:*

Be it known that I, JOHN T. LISTER, a citizen of the United States, residing at Cleveland, in the county of Cuyahoga and State of Ohio, have invented a certain new and useful Improvement in Storage-Battery Systems, of which the following is a full, clear, and exact description.

This invention relates to storage battery systems and particularly to systems employed in electric or battery driven vehicles.

The principal object of the invention is to increase the field of use of such systems and especially to provide means whereby the extent of active use or operation of a system is not dependent on the amount of potential energy contained in a single set of batteries, and further to overcome the disadvantages of and delay incident to the recharging of batteries or the replacing of discharged with charged batteries.

My invention contemplates the use of two sets of storage batteries, either of which may be connected to the motor or translating device, a source of current preferably a small engine driven generator which may be connected to one battery so as to charge the same while the other battery is connected to the translating device.

In the preferred embodiment of my invention the connecting of one set of batteries to the translating device and the disconnecting of the other set therefrom, and the connecting of the generator to the discharged or partially discharged set of batteries is done simultaneously and automatically by switch devices which are thrown into operation or actuated by the condition of one of the batteries or the extent to which it has been charged or discharged.

My invention may be further briefly summarized as consisting in certain novel combinations and arrangements of parts which will be described in the specification and set forth in the appended claim.

For an understanding of my invention reference may be had to the accompanying drawing which shows diagrammatically a system embodying one form of my invention.

In the drawing, 10 represents a translating device, in this case a direct current electric motor provided with terminal conductors 11 and 12.

13 and 14 represent respectively two sets of storage batteries, either one of which may be connected to the motor 10, the former having positive and negative terminal conductors 15 and 16, and the latter having positive and negative terminal conductors 17 and 18. For connecting one set of batteries to the motor and at the same time disconnecting the other set therefrom, I employ in this case a double throw electromagnetic switch designated as a whole by the reference character 19, this switch being provided with two bridging contacts 20 and 21, and two sets of stationary contacts 22, 23, and 24, 25. The contacts 22 and 23 are connected respectively by conductors 26 and 27 to the negative side of battery set 13 and to the negative terminal 12 of motor 10, while the set of contacts 24 and 25 are connected respectively by conductors 28 and 29 to the positive side of battery set 14 and to the positive terminal 11 of the motor. The switch 19 also includes a core or plunger 30 to which the bridging contacts 20 and 21 are mechanically connected, and two solenoid coils 31 and 32, the former of which when energized is adapted to draw the core and bridging contacts to the left, as viewed in the drawings, so as to cause the contact 20 to engage and bridge the contacts 22 and 23 and to connect the battery set 13 to the motor, and the coil 32 when energized serving to draw the switch to the right so as to disconnect the battery set 13 from the motor and to connect the battery set 14 to the motor by the engagement of the bridging contact 21 with the stationary contacts 24 and 25. I have provided in this case means whereby the electrical condition of one set of batteries throws the switch from one position to the other and in this case this is accomplished by means of two electro-magnetic relay switches 33 and 34, the former including a coil 35 bridged across the terminal conductors of battery set 13, a vertically movable plunger 36 provided with a bridging contact 37 and two stationary contacts 38 and 39 located in circuit with or in one of the conductors connecting the solenoid coil 31 across the terminal conductors 15 and 16 of battery set 13. The relay switch 34 includes a solenoid coil 40 which is connected across the terminals 17 and 18 of battery set 14, a vertically movable plunger 41 having at its lower end a bridging contact 42 and two stationary contacts 43 and 44 which are adapted to be bridged by the contact 42 and are located in circuit with or in one of the conductors connecting the solenoid coil 32 across the terminal conductors 17 and 18 of battery set 14. The resistance of the coils or of the circuits of the coils of the relay switches 33 and 34 may be quite high so that very little current need pass through the coils.

At 45 is shown a generator which is provided with positive and negative terminal conductors 46 and 47, and which is intended to charge one set of batteries while the other set is connected to the motor. This generator is preferably driven by an internal combustion engine 48, which is shown in the drawing as connected to the generator. To connect the terminal conductors 46 and 47 to either set of batteries, I employ a double throw switch 49 which operates in conjunction with the switch 19 and in this instance is mechanically interlocked with the switch 19 and is operated thereby. This switch which as here shown is of the rotary type includes two movable contact members or blades 50 and 51 electrically disconnected from one another, and four stationary contacts 52 and 53 connected to the terminal conductors 15 and 16 of battery set 13, and 54 and 55 connected to the terminal conductors 17 and 18 of battery set 14. The terminal conductors 46 and 47 of the generator 45 are electrically connected respectively to the two movable switch blades 50 and 51. The switch 49 is operated by the switch 19, in this case by means of a pivoted lever 56, one end of which is connected with the core plunger 30 of switch 19 and the other end of which is loosely connected to the switch 49, the lever 56 being pivoted between its ends with the result that when the switch 19 is thrown in one direction, the switch 49 is thrown in the opposite direction and vice versa.

When the two switches 19 and 49 are in the positions shown, it will be seen that battery set 14 is connected to and supplies current to the motor 10, so as to drive the same. At the same time, battery set 13 is disconnected from the motor but is connected through switch 49 to the generator 45 which supplies current thereto so as to charge the same. The plungers and coils of the relay switches 33 and 34 are so designed that the plungers will be raised only at a predetermined voltage of the corresponding set of batteries or on the passage of current of predetermined value through the coil circuits. Therefore when the battery set 13 is fully charged by the generator, or is charged to a predetermined point, the relay switch 33 will be operated, closing the circuit through the coil 31 of switch 19. The coil will therefore be energized and the switch 19 will be thrown to the opposite position or to the left, inasmuch as the circuit of coil 32 of switch 19 was previously broken at the switch 34 when the current charge in battery set 14 dropped to a predetermined value. The positions of the switches 19 and 49 will therefore be reversed with respect to the positions shown on the drawing so that the battery set 13 which is in charged condition is connected to the motor and battery set 14 which may be wholly or partially discharged is at the same time disconnected from the motor and is connected by switch 49 to the generator 45. Thus, the operation is continuous and the motor is disconnected from the practically discharged battery to the charged battery without any interruption and without even being brought to a stop. When the battery 14 is charged to a predetermined value, the connections will again be reversed in a manner above stated.

This system above described is designed primarily for use in motor vehicles provided with battery driven or battery supplied motors. The motor and generator need not be of large size in view of the work which they are to accomplish and may, if desired, be mounted in the hood of the vehicle. With this arrangement, one set of batteries in the vehicle is maintained in practically charged condition, or at least in condition for immediate use, when the other set is discharging. Consequently, the vehicle can be run for a long period without any interruption as far as the recharging of the batteries is concerned.

It is apparent that my invention is capable of considerable modification, within the scope of the appended claim and I do not desire to be confined to the exact arrangements shown.

Having thus described my invention, what I claim is:—

In an electrical system, a translating device, two storage batteries, a charging generator, switching mechanism for connecting one battery to the translating device and the other battery to the generator, and for reversing the connections when a battery reaches a predetermined condition of charge, said switching mechanism including an electromagnetic switch having connections with both batteries and having a pair of operating coils normally deënergized, and means for causing the energization of said coils comprising a pair of electro-magnetic relay switches each having a coil adapted to be energized by current from one of the batteries.

In testimony whereof, I hereunto affix my signature in the presence of two witnesses.

JOHN T. LISTER.

Witnesses:
H. R. SULLIVAN,
A. F. KWIS.